US007328226B1

(12) United States Patent
Karr et al.

(10) Patent No.: US 7,328,226 B1
(45) Date of Patent: Feb. 5, 2008

(54) COORDINATED DISTRIBUTED LOG-BASED SNAPSHOTS IN A MULTI-HOST ENVIRONMENT

(75) Inventors: Ronald S. Karr, Sunnyvale, CA (US);
Oleg Kiselev, Palo Alto, CA (US);
John A. Colgrove, Los Altos, CA (US)

(73) Assignee: Symantec Operating Corporation, Cupertino, CA (US)

( * ) Notice: Subject to any disclaimer, the term of this patent is extended or adjusted under 35 U.S.C. 154(b) by 905 days.

(21) Appl. No.: 10/610,405

(22) Filed: Jun. 30, 2003

(51) Int. Cl.
*G06F 7/00* (2006.01)
(52) U.S. Cl. .................................................. 707/204
(58) Field of Classification Search ................ 707/200, 707/202, 203, 204, 205
See application file for complete search history.

(56) References Cited

U.S. PATENT DOCUMENTS

| 5,666,514 | A | * | 9/1997 | Cheriton ..................... 711/144 |
| 5,878,414 | A | | 3/1999 | Hsiao et al. |
| 5,966,706 | A | | 10/1999 | Biliris et al. |
| 6,457,098 | B1 | * | 9/2002 | DeKoning et al. .......... 711/114 |
| 6,519,677 | B1 | | 2/2003 | Fuente |
| 6,553,509 | B1 | | 4/2003 | Hanson et al. |
| 6,567,889 | B1 | | 5/2003 | DeKoning et al. |
| 6,594,744 | B1 | * | 7/2003 | Humlicek et al. .......... 711/162 |
| 6,681,339 | B2 | | 1/2004 | McKean et al. |
| 6,763,436 | B2 | | 7/2004 | Gabber et al. |
| 6,807,642 | B2 | | 10/2004 | Yamamoto et al. |
| 6,820,099 | B1 | * | 11/2004 | Huber et al. ................ 707/204 |
| 6,851,005 | B1 | | 2/2005 | Gnanasivam et al. |
| 6,871,228 | B2 | | 3/2005 | Shah et al. |
| 6,877,109 | B2 | | 4/2005 | Delaney et al. |
| 6,880,062 | B1 | | 4/2005 | Ibrahim et al. |
| 6,895,415 | B1 | | 5/2005 | Rezaul Islam et al. |
| 6,928,518 | B2 | | 8/2005 | Talagala |
| 2003/0126282 | A1 | | 7/2003 | Sarkar et al. |
| 2003/0135808 | A1 | | 7/2003 | Kakuta et al. |

(Continued)

FOREIGN PATENT DOCUMENTS

WO          2005103731 A1     11/2005

OTHER PUBLICATIONS

Lee et al., ASPLOS VII Oct. 1996, MA USA, pp. 84-92, 1996.*

(Continued)

*Primary Examiner*—Cheyne D Ly
(74) *Attorney, Agent, or Firm*—Meyertons Hood Kivlin Kowert & Goetzel, P.C.; B. Noël Kivlin (57) ABSTRACT

A method for coordinating access to a storage volume between several hosts, each of which has an associated log, may involve: one of the hosts requesting permission from a coordinator to perform a write to a region of the storage volume; the host storing write data for the write to an associated log; and the coordinator sending a response granting permission to perform the write to the host, where the response indicates whether an old version of data in the region of the storage volume should be relocated to a COW (Copy On Write) snapshot volume. The host may signal completion of the write to an application that initiated the write prior to performing the write to the region of the storage volume and subsequent to both storing the write data to the associated log and receiving the response from the coordinator.

29 Claims, 6 Drawing Sheets

U.S. PATENT DOCUMENTS

2003/0212752 A1* 11/2003 Thunquest et al. ......... 709/213

OTHER PUBLICATIONS

Elnozahy et al., IEEE, pp. 39-47, 1992.*
Ji et al., Proceedings of USENIX Technical Conference (San Antonio, TX), pp. 253-268, Jun. 2003.*

Nelson M. et al. "Caching in the Sprite Network File System" ACM Transactions on Computer Systems vol. 6 No. 1 Feb. 1998 pp. 134-154.

IBM Technical Disclosure Bulletin Use of Non-Volatile Semiconductor Storage for Disk Array Parity vol. 33 No. 6B Nov. 1990 p. 254.

* cited by examiner

COORDINATED DISTRIBUTED LOG-BASED SNAPSHOTS IN A MULTI-HOST ENVIRONMENT

BACKGROUND

1. Field of the Invention

This invention relates to data storage and, more particularly, to techniques for performing write logging when accessing a data volume shared between multiple hosts.

2. Description of the Related Art

Many business organizations and governmental entities rely upon applications that access large amounts of data, often exceeding a terabyte or more of data, for mission-critical applications. Many of these applications require near-continuous access to data. For example, many systems such as retail processing databases, airline reservation databases, and financial institution databases must be available to perform transaction processing 24 hours a day. Downtime associated with such systems can be disastrous.

With the growing amounts of data and shrinking acceptable downtime requirements of modern systems, organizations are sometimes forced to choose between the conflicting demands associated with modern systems. For example, secondary operations such as data backup operations, reporting and analysis, and application testing can be of significant importance. However, such secondary operations can interrupt or encumber the normal transaction processing of a host system running various applications. For example, various storage techniques such as copy-on-write snapshots, replication, and RAID (Redundant Array of Independent Disks) processing may be implemented to increase reliability and/or availability of a storage volume. However, the complex operations used to implement block storage features such as these may undesirably add to the latency of block operations to the underlying storage volume.

SUMMARY

Various systems and methods for performing distributed log-based COW (Copy On Write) snapshots are provided. A method for coordinating access to a storage volume between several hosts, each of which has an associated log, may involve: one of the hosts requesting permission from a coordinator to perform a write to a region of the storage volume; the host storing write data for the write to an associated log; and the coordinator sending a response granting permission to perform the write to the host, where the response indicates whether an old version of data in the region of the storage volume should be relocated to a COW (Copy On Write) snapshot volume. The host may signal completion of the write to an application that initiated the write prior to performing the write to the region of the storage volume and subsequent to both storing the write data to the associated log and receiving the response from the coordinator.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Figure 1:
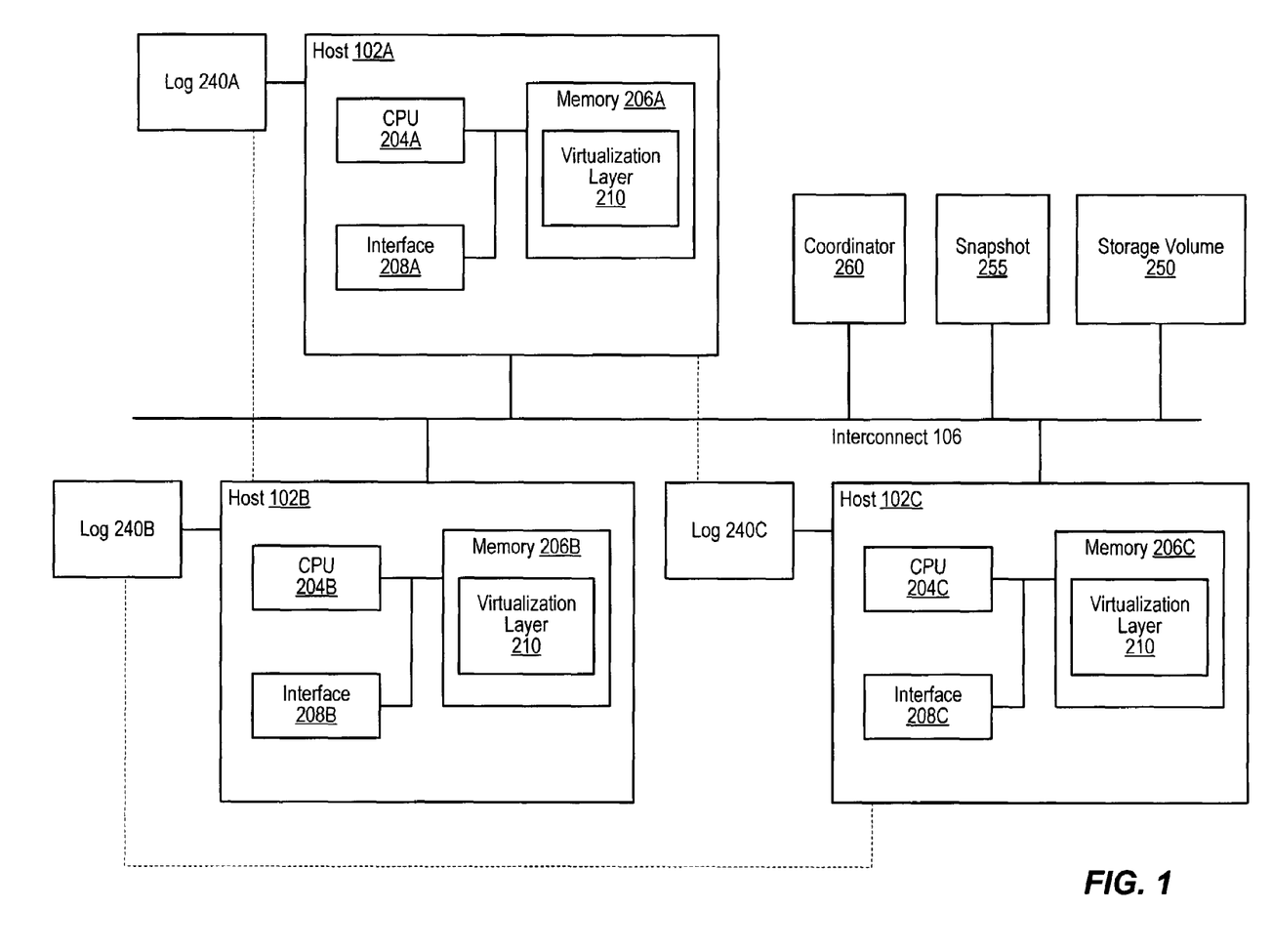
FIG. 1 is a block diagram illustrating several hosts coupled to one or more data volumes, according to one embodiment.

FIG. 1 illustrates a block diagram of a computer system that includes several hosts 102A-102C (collectively, hosts 102) coupled by one or more communication interconnects 106 to a coordinator 260, one or more snapshot volumes 255 for use in implementing COW (Copy On Write) snapshots, and one or more storage volumes 250. As used herein, the term "host" refers to any computing device that includes a memory and a processor configured to execute instructions stored in the memory, or to any integrated circuit (e.g., an FPGA (Field Programmable Gate Array) or ASIC (Application Specific Integrated Circuit)) configured to perform the functions specified by such instructions, or any mechanical device configured to perform such functions. Each host 102 may include various conventional software and hardware components. For example, hosts 102 may run any of a variety of operating systems such as a UNIX operating system such as Solaris, a Linux operating system, or a Windows operating system. Hosts 102A-102C are illustrated with one or more processors 204 as well as a main memory 206 for storing instructions and/or data accessible by the processors 204. In one embodiment, main memory 206 is implemented using dynamic random access memory (DRAM), although it is noted that in other embodiments, other specific types of memory or combinations thereof may be utilized. Hosts 102A-102C may also each include one or more interfaces 108 for interfacing with other hosts, clients, and/or storage devices (on which the storage volume(s) 250, snapshot volume(s) 255, and/or logs 240 may be implemented) via communication interconnect(s) 106.

The coordinator 260 may be implemented on a single host 102 in some embodiments. For example, the coordinator 260 may be implemented in software stored in the memory 206 and executed by a processor 204 in one of the hosts 102. In other embodiments, the coordinator 260 may be distributed among hosts 102 (e.g., each host 102 may execute software implementing a distributed coordinator 260).

FIG. 1 further illustrates various software components executable by processors 204 out of a memory medium such as main memory 206. The depicted software components include a virtualization layer 210. It is noted that these software components may be paged in and out of main memory 206 from a secondary storage medium according to conventional techniques.

The virtualization layer 210 of FIG. 1 includes functionality to virtualize the physical storage accessible by applications running on hosts 102. The virtualization layer 210 may support various specific storage management functionality, such as various levels of RAID functionality, data mirroring, and/or replication. In some embodiments, the virtualization layer 210 may be part of a volume manager application. As used herein, the term "volume manager" broadly refers to host software that selects and combines storage space from one or more physical storage devices into a logical volume. In one embodiment, the volume manager is a Veritas Volume Manager™ product available from Veritas Software Corporation.

In the illustrated embodiment, the hosts 102 communicate with coordinator 260 and storage volume(s) 250 via an interconnect 106. Each volume 250 may be accessed by user applications (e.g., database applications) executing on hosts 102 through the virtualization functionality provided by virtualization layer 210. It is noted that each volume 250 corresponds to a partitioning and/or aggregation of physical storage provided by one or more storage devices including, but not limited to, single storage devices (e.g., disk drives), storage systems such as RAID (Redundant Array of Independent Disks) systems, disk arrays, JBODs (Just a Bunch Of Disks, used to refer to disks that are not configured according to RAID), tape devices, and optical storage devices. These devices may be products of any of a number of vendors including, but not limited to, Compaq, EMC, and Hitachi. A volume 250 may be formed from a portion of the overall storage of a physical device, from the storage of an entire physical device, or from the storage of multiple physical storage devices combined.

The virtualization layer 210 may perform block operations in response to read and write requests generated by applications executing on each host 102. In particular, the virtualization layer 210 may perform the various complex underlying block operations (e.g., parity calculations and striping for RAID, writing multiple copies of data for mirroring, data movement to implement copy-on-write storage snapshots and/or replication, etc.) implemented on the storage volume(s) 250 while allowing applications to interface with the storage volume(s) 250 using basic read and write operations. In other words, the virtualization layer 210 may operate to abstract the complexities of the underlying block storage features away from the applications accessing storage volumes 250. The virtualization layer 210 may allow applications to access storage volumes 250 as an array of fixed-size readable and writeable logical blocks. As used herein, a block is a unit of storage (e.g., a 512 byte block) that may be written or read as a single I/O operation.

Each host 102 has a corresponding log 240. As used herein, a "log" is a non-volatile storage volume or portion thereof on which data can be temporarily or permanently stored prior to being written to an underlying storage volume 250. Similarly, "logging" is the act of writing data to such a log. The block operations performed by virtualization layer 210 to implement each write to the underlying storage volume 250 may require a significant amount of resources and/or time to perform. By temporarily storing data being written to the storage volume 250 in a log 240 and signaling completion of writes to initiating user applications in response to storing the write data in a log 240, the virtualization layer 210 may reduce the write latency of at least some of the writes initiated by applications executing on hosts 102 and/or improve the usage of resources needed to perform the underlying block operations. For example, in response to an application executing on host 102A initiating a write to storage volume 250, the virtualization layer 210 may store the data to be written to the storage volume in log 240A. The virtualization layer 210 may signal completion of the write to the initiating application as soon as the write data has been stored in the log 240A and a communication from the coordinator 260 is received, as will be described in more detail below. Subsequent to signaling completion of the write to the initiating application, the virtualization layer 210 may perform the underlying block operations needed to actually update the targeted region of the storage volume 250. Thus, the latency of the write, as seen by the initiating application, may be less than the time taken to actually complete all of the operations associated with the write to the storage volume 250.

Since each log 240 provides non-volatile storage, the write data is protected in case of a system failure prior to actual completion of the write to the storage volume 250. For example, if a system crash (e.g., a failure of the one of the hosts 102 performing the write) occurs after the write is signaled as complete to the initiating application but before the underlying block operations have completed to the storage volume 250, the underlying block operations may be completed by another host on crash recovery by retrieving the write data from the log 240. Accordingly, each log 240 may be accessible by at least one other host 102 to facilitate crash recovery, as shown by the dashed lines in FIG. 1. In some embodiments, each log 240 may be accessible by each host 102 (e.g., via interconnect 106).

As shown in FIG. 1, the virtualization layer 210 is distributed among several hosts 102. Each instance of the distributed virtualization layer 210 may be configured to log writes to the storage volume 250 in a log 240 that is associated with the host on which that instance is executing. For example, the virtualization layer 210 executing on host 102B is configured to log writes to host 102B's log 240B.

The virtualization layer 210 may operate to ensure that read and write semantics are preserved for all hosts 102 that access storage volume(s) 250. In general, preserving semantics involves ensuring that a read operation to a logical block returns the last value written to that block. The virtualization layer 210, in conjunction with coordinator 260, may operate to preserve write semantics by serializing successive accesses to each block and guaranteeing that each read to a block will return the most recently written value of that block.

In order to coordinate between writes initiated on different hosts 102, each instance of the distributed virtualization layer 210 may be configured to communicate with a coordinator 260 before allowing a locally initiated write to be signaled as being completed. For example, before an instance of the virtualization layer 210 executing on host 102B can signal completion of a write initiated by an application on host 102B, that instance may request permission to perform the write from the coordinator 206 and wait until a response is received from the coordinator indicating that permission to perform the write is granted. As mentioned above, signaling completion of the write also depends on storing the write data to local log 240B. The virtualization layer 210 may begin storing the write data to log 240B before the coordinator's response is received. Since performance of the write to the log 240B is not dependent on receipt of the coordinator's response, the write may be signaled as being completed sooner than if the write data was not written to the log 240B until after receipt of the coordinator's response.

The virtualization layer 210 and coordinator 260 may be configured to interact to implement a COW snapshot mechanism in order to generate COW snapshots of the contents of the underlying storage volume 250 at various points in time. Generally, for each point-in-time snapshot, the virtualization layer 210 and coordinator 260 may operate to copy data to a snapshot volume 255 from regions of the storage volume 250 prior to subsequent modification of those regions of the storage volume 250. The virtualization layer 210 may map accesses to the point-in-time snapshot to the appropriate data on either the storage volume 250 (if that data has not been modified since the point-in-time snapshot was created) or the snapshot volume 255 (which stores the original version of each region of the storage volume 250 that has been modified subsequent to creation of the point-in-time snapshot). Note that other embodiments may use different COW techniques than specific COW techniques described herein.

In one embodiment, in order to implement COW snapshots, the virtualization layer 210 and coordinator 260 may be configured to interact to track which regions of the storage volume 250 have not been modified since the creation of the most recent point-in-time snapshot. Before modifying of one of these regions, the virtualization layer 210 may relocate the original data in that region to the snapshot volume 255. For each point-in-time snapshot, the coordinator 260 may track which regions of the storage volume 250 have been modified and relocated to the snapshot volume 255. For example, the coordinator 260 may maintain a bitmap representing regions of the storage volume 250. The value of each bit in the bitmap may indicate whether a respective region has been relocated or not. Each time a host relocates data in a region of the storage volume 250 to the snapshot volume 255, the host may communicate this relocation to the coordinator 260 and the coordinator 260 may responsively update the bitmap. Once the original data has been relocated, the virtualization layer 210 may modify that region. Successive modifications to a region that has already been relocated for a given point-in-time snapshot will not cause additional relocations. Note that in alternative embodiments, a multi-level bitmap may be implemented in which one level corresponds to regions, another level corresponds to blocks within each region, and so on until a desired granularity of storage locations is represented.

The coordinator 260 may receive requests to access (e.g., read or write) regions of the storage volume 250 from hosts 102. In response to reach request, the coordinator 260 may return a response indicating whether the requested permission is granted and, if the requested access is a write, indicating whether the original data in the targeted region of the storage volume 250 needs to be relocated to a snapshot volume 255 prior to being overwritten by the write. Note that the coordinator may be configured to perform various storage operations and/or other complex operations in additional to handling requests for access to the storage volume 250 from hosts 102. If the coordinator 260 is performing an operation when a request for access to the storage volume 250 is received from the host 102, the coordinator may be configured to complete the current operation before responding to the request. The coordinator 260 may also perform such operations in between handling requests from hosts 102 for access to storage volume 250.

Whenever a write targets a region of the storage volume 250 that has not yet been relocated, the virtualization layer 210 may store the write data to an appropriate log 240 while waiting for permission to perform the write to the underlying storage volume 250 from the coordinator 260. In some embodiments, the virtualization layer 210 may also begin reading the original data from the targeted region of the storage volume 250 in anticipation of needing to relocate the data. When the log write completes and the virtualization layer 210 is granted permission to perform the underlying block operations to the storage volume 250, the virtualization layer 210 may signal completion of the write to the initiating application.

Note that in some embodiments, the virtualization layer 210 may not begin reading the original data until the coordinator 260 has indicated whether COW relocation is necessary. In other embodiments, the virtualization layer 210 may selectively begin the read to the storage volume 250 before the coordinator's response or wait to begin the read until after the coordinator's response is received based on current conditions of the system. For example, the virtualization layer 210 may track statistics indicating how many writes are resulting in COW relocations and how full the COW maps are. These statistics may indicate that likelihood that an additional write will result in another COW relocation. Based on these statistics, the virtualization layer 210 may determine whether to begin reading before the coordinator's response or to delay such a read until the response is received. In particular, if the COW maps are relatively full, it may indicate that COW relocations are less likely, and thus the virtualization layer 210 may delay initiating the read until the coordinator's response is received. This may reduce the likelihood of degrading performance due to unnecessary I/O.

If the coordinator's response indicates that the original data needs to be relocated, the virtualization layer 210 may write the original data to the snapshot volume 255 when the read of the original data from the storage volume 250 completes. Once the original data has been relocated, the virtualization layer 210 may perform the underlying block operations to update the storage volume 250 according to the write. Upon completing the underlying block operations to the storage volume 250, the virtualization layer 210 may relinquish its write permission by sending a message indicating completion of the write to the coordinator 260.

If a system fails before completion of the asynchronous activity (i.e., writing the original data to the snapshot volume 255 and/or performing the logged write to the storage volume 250) for a write that was signaled complete to its initiating application, the write data may be recovered from the log 240 and written to the storage volume 250, after the original data has been relocated to the snapshot volume 255, if needed. As asynchronous activity for each logged write completes, the virtualization layer 210 may write information to the log 240 indicating that the logged write does not need to be replayed when recovering from a system crash. This information may be used to determine which writes to replay during crash recovery.

In some embodiments, each host 102 may track which regions of the storage volume 250 are known to be already relocated to the snapshot volume 255. For example, host 102A may maintain information indicating which regions of the storage volume 250 that host 102A has relocated to the snapshot volume 255 for a given point-in-time snapshot. Each time that host 102A relocates original data from a region of the storage volume 250 to the snapshot volume 255, that host 102A may update its information identifying relocated regions. Similarly, if that host 102A receives a message from the coordinator 260 indicating that a targeted region of the storage volume 250 has already been relocated by another host 102B, the host 102A may update its information identifying relocated regions. If an application executing on a particular host 102A writes to a region of the storage volume 250 already known by that host to be relocated, the host 102A may perform the write to the underlying storage volume 250 without either logging the write data to the host's log 240 or obtaining a lock from the coordinator 260. In some embodiments (e.g., embodiments in which the storage volume 250 does not include a large write cache), this may be conditioned on heuristics that indicate whether the write to the log 240 will be faster than the write to the storage volume 250. For example, if the host 102A is currently performing sequential writes that may be performed efficiently to the storage volume 250, the host may perform the write directly to the storage volume 250. If instead the host is performing a series of non-sequential writes that may involve significant overhead (e.g., waiting for the next targeted storage location on a disk to rotate underneath the disk write head), the host 102A may perform the write to the log 240. In alternative embodiments, the hosts 102 may be configured to log all writes, regardless of whether the region being written has already been relocated by that host.

Sometimes two (or more) hosts may have conflicting writes to the same region of the storage volume 250 due to the ability of one host to return from a write prior to completion of the underlying block operations needed to perform that write to the storage volume 250. If one host 102A initiates a write to a region of the storage volume 250 that is currently being written and/or relocated by another host 102B, the coordinator 260 may not grant the host 102A permission to perform the write to the storage volume 250 until the other host 102B has completed the underlying block activity needed to relocate the original data to the snapshot volume 255 and to write the new data to the storage volume 250. For example, the coordinator 260 may send the host 102A a reply indicating that the targeted region is currently being modified. The coordinator 260 may send another message to host 102A granting write permission when host 102B's write completes to the storage volume 250. Since the other host 102B will have relocated the original data, host 102A will not need to relocate the data to the snapshot volume 255. Accordingly, the host 102A may log the write data in its log 240A and wait for the coordinator 260 to grant it permission to write the storage volume 250.

Unlike in situations that do not involve conflicting writes to the same region of the storage volume 250, a host 102A performing a write that experiences a write conflict with another host 102B may not signal completion of the write to the initiating application until that host 102A's write to the storage volume has completed, the log 240A has been updated to indicate that the logged write does not need to be replayed upon recovery, and the host 102A has relinquished its write permission to the targeted region of the storage volume 250. This may increase the likelihood of consistent crash recovery if a crash occurs while two hosts 102A and 102B have write data targeting the same region stored in their logs 240A and 240B, as described in more detail below with respect to FIG. 2B. Alternatively, crash recovery may be simplified by having each host 102 tag each log entry for each logged write with a count value (e.g., provided by the coordinator 260). The relative counts stored with each log entry may indicate the relative order in which the log entries were generated. This ordering information, in addition to information indicating which logged writes were successfully completed to the storage volume 250, may allow the recovery mechanism to select which logged writes need to be replayed and/or whether any relocation of the original data to the snapshot volume 255 needs to be replayed.

The virtualization layer 210 may also interact with the coordinator 260 when performing reads to the storage volume 250. The coordinator 260 may delay reads targeting regions of the storage volume 250 that are currently being written or, alternatively, the coordinator 260 may redirect such reads to a log 240 storing the updated value of the data in that region. The virtualization layer 210 may perform reads either by speculatively initiating reads to the storage volume prior to receiving a response from the coordinator 260 indicating whether the targeted region of the storage volume 250 is currently being written or by waiting for the coordinator's response prior to reading the data from the storage volume 250. If reads are redirected to logs 240, each read that is redirected may acquire a lock on the portion of the log 240 to which the read is redirected. While a portion of a log is locked by a read, the host 102 coupled to that log may not reuse that portion of the log. A read lock on a portion of a log 240 may be released asynchronously after completion of the read. In some embodiments in which the logs 240 are implemented using an access mechanism in which sequential accesses are more efficient than random accesses, read redirections to logs 240 may be limited or prohibited in order to avoid degrading log performance.

Figure 2A:
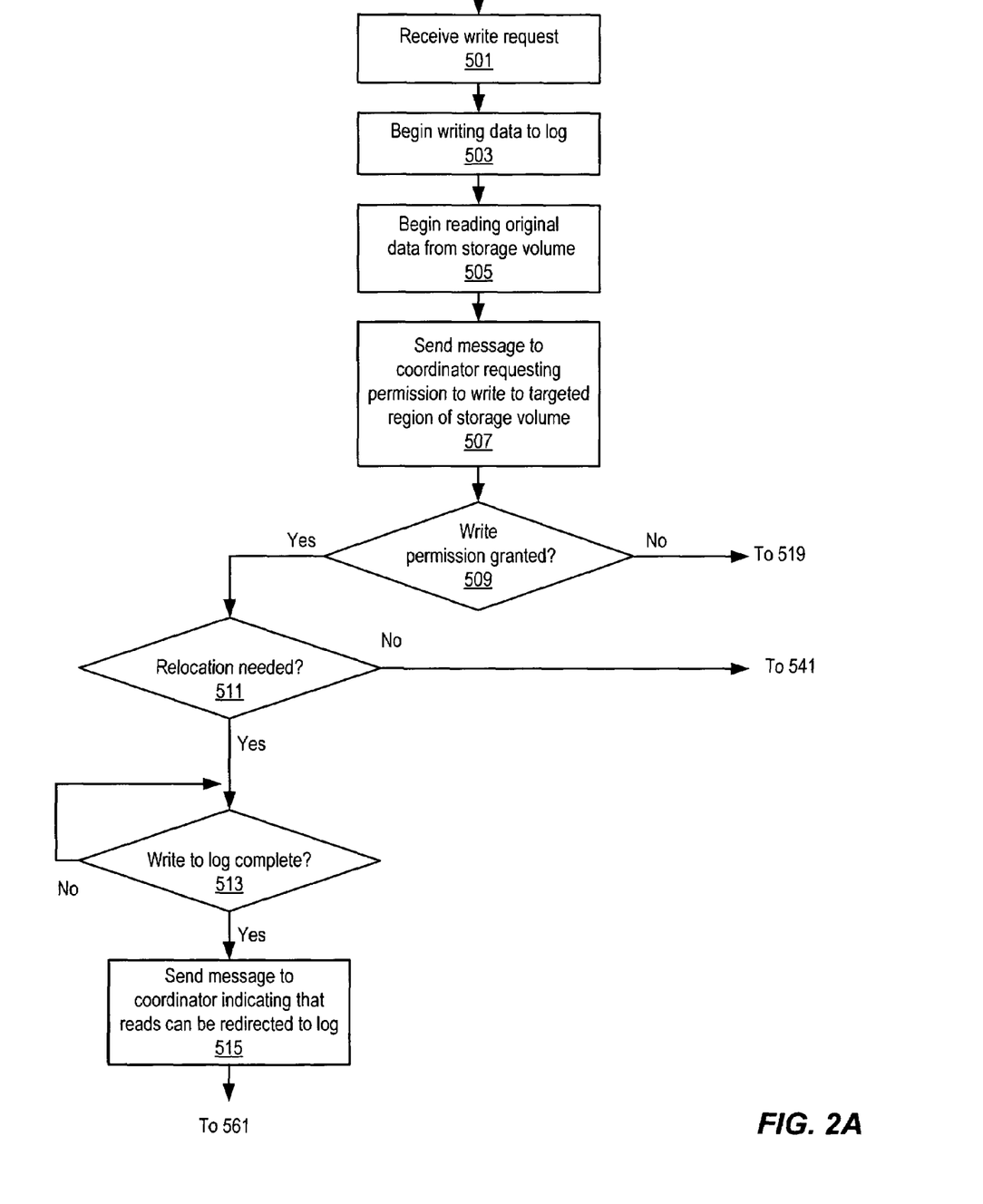
FIGS. 2A-2D show a flowchart illustrating how distributed logged writes may be coordinated between hosts in a system that implements COW (Copy On Write) snapshots, according to one embodiment.

FIGS. 2A-2D illustrate one embodiment of a method of performing log-based snapshots in a distributed environment. It is noted that the functions shown in FIGS. 2A-2D may be performed by a virtualization layer executing on a host. In FIG. 2A, a host receives a write request from an application executing on that host, as indicated at 501. In response to the write request, the host begins writing the data to its log, as shown at 503. As shown at 505, the host may also begins reading the original data from the region of the storage volume targeted by the write in anticipation of needing to relocate that data to a snapshot volume (as described above, this function may be selectively (or always) delayed until the coordinator's response indicating relocation is necessary is received). The host additionally sends a message to the coordinator requesting permission to write to the targeted region of the storage volume, as shown at 507. For example, the host may send a message requesting an exclusive lock on the targeted region. The coordinator receives write permission requests generated by several different hosts for regions within the storage volume and responds to each write permission request to indicate whether write permission is granted. The actions in blocks 503-507 may be performed in various different orders or at substantially the same time.

The coordinator's response to the request sent at 507 may indicate whether write permission to the region is granted (e.g., write permission may be denied if the region is currently being modified by another writer) and whether the original data in the targeted region needs to be relocated to a snapshot volume. If write permission is granted, as determined at 509, and if relocation of the targeted region is needed, as determined at 511, the writing host may operate as shown at 513-515 and in FIG. 2D.

At 513, the host waits for the write to the log to complete (if the write to the log has not already completed). Upon completion of the write to the log, the host may send the coordinator a message indicating that any reads targeting the same region of the storage volume as the current write may be redirected to the host's log, as shown at 515. In response to this message, the coordinator may begin redirecting any reads that target the same region of the storage volume as the write to the host's log. Note that in alternative embodiments, the host may not perform function 515. In such embodiments, the coordinator may block reads targeting the same region of the storage volume targeted by the write until completion of the underlying block operations needed to perform the write to the storage volume (e.g., as indicated by performance of function 573 described below).

At 561, the host waits for a response from the coordinator acknowledging the message sent at 515. When this response is received, the host may signal completion of the write to the application that initiated the write, as indicated at 563.

Note that in alternative embodiments, the host may signal completion of the write to the initiating application as soon as the write to the log completes at 513 and the coordinator grants write permission at 509 (e.g., in embodiments where the host does not perform functions like those shown in blocks 515 and 561). Waiting at least until the coordinator grants write permission to the targeted region before signaling completion of the write to the initiating application may guarantee that block operation semantics are preserved between the different hosts. For example, the coordinator may only allow one host at a time to have permission to write to a particular block of the storage volume, effectively serializing different hosts' accesses to the same block. Waiting until the write to the host's log has completed prior to signaling completion of the write may ensure that, if a system crash occurs subsequent to signaling completion of the write, the underlying block operations needed to write that data to the storage volume can be completed from the non-volatile log.

At 565, the host determines whether the read initiated at 505 has completed. When the read completes, the host writes the original data read from the storage volume to the snapshot volume, as indicated at 567. The coordinator may mark that region of the storage volume as having been relocated upon completion of the write to the snapshot volume. It is noted that the function shown in block 567 may be performed at substantially the same time as or before the functions shown in blocks 513-515 and 561-563.

As soon as the original data is relocated to the snapshot volume, as determined at 569, the host may perform the block operations needed to perform the write to the underlying storage volume, as shown at 571. The host performs the block operations to write the data to the underlying storage volume asynchronously with signaling completion of the write to the initiating application. The underlying block operations are asynchronous in the sense that the write may be signaled as being completed to the initiating application prior to the performance of the underlying block operations. When these operations are complete, the host may also send a message to the coordinator relinquishing permission to write to the region of the storage volume, as indicated at 573. The coordinator may then grant write permission to the same block (or blocks) to another host. The coordinator may not grant write permission to the same block to another host until the asynchronous block activity has completed, effectively preventing any other write to that block (or blocks) from being signaled as complete to an initiating application until the asynchronous block operations for the write requested at 507 have completed. The host may also write information to its log indicating that the logged write does not need to be replayed as part of crash recovery, as shown at 575.

Figure 2B:
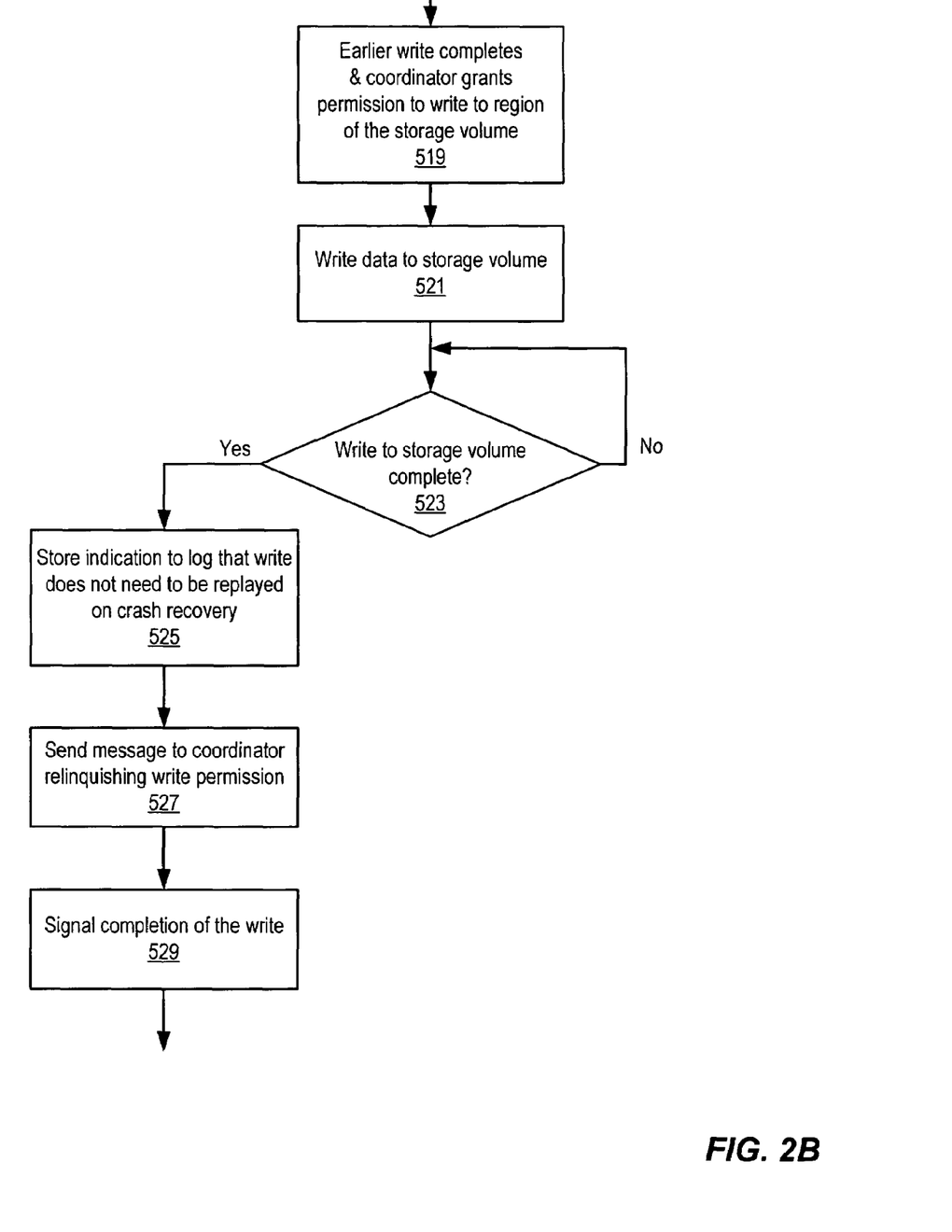

Looking back at block 509, if write permission to the targeted region is not granted (e.g., because the targeted region is currently being written by another host), the host may operate as shown in FIG. 2B. The host may delay its write to the storage volume until the asynchronous block operations for the other host's write complete. When the other host relinquishes its permission to write to the targeted region, the coordinator may grant the host permission to perform its write, as shown at 519.

In response to gaining write permission to the storage volume, the host performs the block operations needed to perform the write to the storage volume, as indicated at 521. When these operations complete, as determined at 523, the host may store an indication to its log indicating that the logged write does not need to be replayed during crash recovery, as shown at 525. The host may also send a message to the coordinator relinquishing write permission to the storage volume, as indicated at 527. Upon completing functions 523 and 525, the host may also signal completion of the write to the initiating application, as indicated at 529.

In this embodiment, due to the conflicting write detected at 509, the host does not signal completion of the write to the initiating application upon completing the write to the log and receiving permission to write to the storage volume from the coordinator. Instead, the host waits until the asynchronous block operations complete and information is written to the host's log indicating that the logged write does not need to be replayed during crash recovery, as indicated at 523-529.

Waiting to signal completion of the write to the initiating application when a write conflict is experienced may simplify crash recovery. For example, if the host performing the current write signals completion to the initiating application as soon as that host receives write permission from the coordinator and finishes logging the write data, and if a crash occurs before the host completes the asynchronous block activity needed to perform the write to the storage volume, both the host performing the current write and the host performing the earlier write may have log entries corresponding to writes to the same region of the storage volume. If the host performing the earlier write had not yet stored information to its log indicating that its write did not need to replay on crash recovery, it may be difficult to determine which write, if any, should be replayed. However, this determination may be simplified if the host performing the current write does not signal completion of the current write to the initiating application until after the host has completed the asynchronous activity and stored information indicating that the logged write does not need to be replayed on crash recovery. For example, if during crash recovery more than one log entry is found that contains data for the same region of the storage volume, and if either or both log entries are identified as not needing replay on crash recovery, neither logged write may be replayed. This leads to consistent results since if both log entries are identified as being complete, both logged writes necessarily completed to the storage volume. If one log entry is indicated as not needing recovery and the other is not, then consistent results are also achieved: if the logged write indicated as not needing recovery occurred earlier than the other logged write, the other logged write would not have been signaled complete to the initiating application (according to blocks 523-529) prior to the crash and as such does not need to be replayed; if the logged write indicated as not needing recovery occurred subsequent to the other logged write, both logged writes were necessarily completed to the storage volume prior to the crash and no replay of either is necessary.

If neither log entry is identified as not needing to be replayed, it indicates whichever of the logged writes occurred last was not signaled as being completed to the initiating application and that therefore the state of the data in that region of the storage volume is indeterminate. In this situation, data from either of the log entries may be written to the region of the storage volume during replay. This occurs because either: (1) the first write completed and the second write was never performed, and thus the second writer was not notified of the write completion, leading to a valid state; or (2) both the first and the second write did complete, resulting in a valid state. In either situation, it does not matter which write was first or second, sine the result space collapses to just two states outlined above. Applications such as file systems and databases have the means to deal with this uncertainty. By holding off the return to the initiating application of the conflicting write until the log invalidation is written at 525, the possibility of a third uncommitted log entry for the same block, which would result in possibility of data corruption, is avoided. Note that other embodiments may operate differently. For example, some embodiments may simplify crash recovery by using count tags for each logged write to identify the relative order of each logged write, as described above.

Figure 2C:
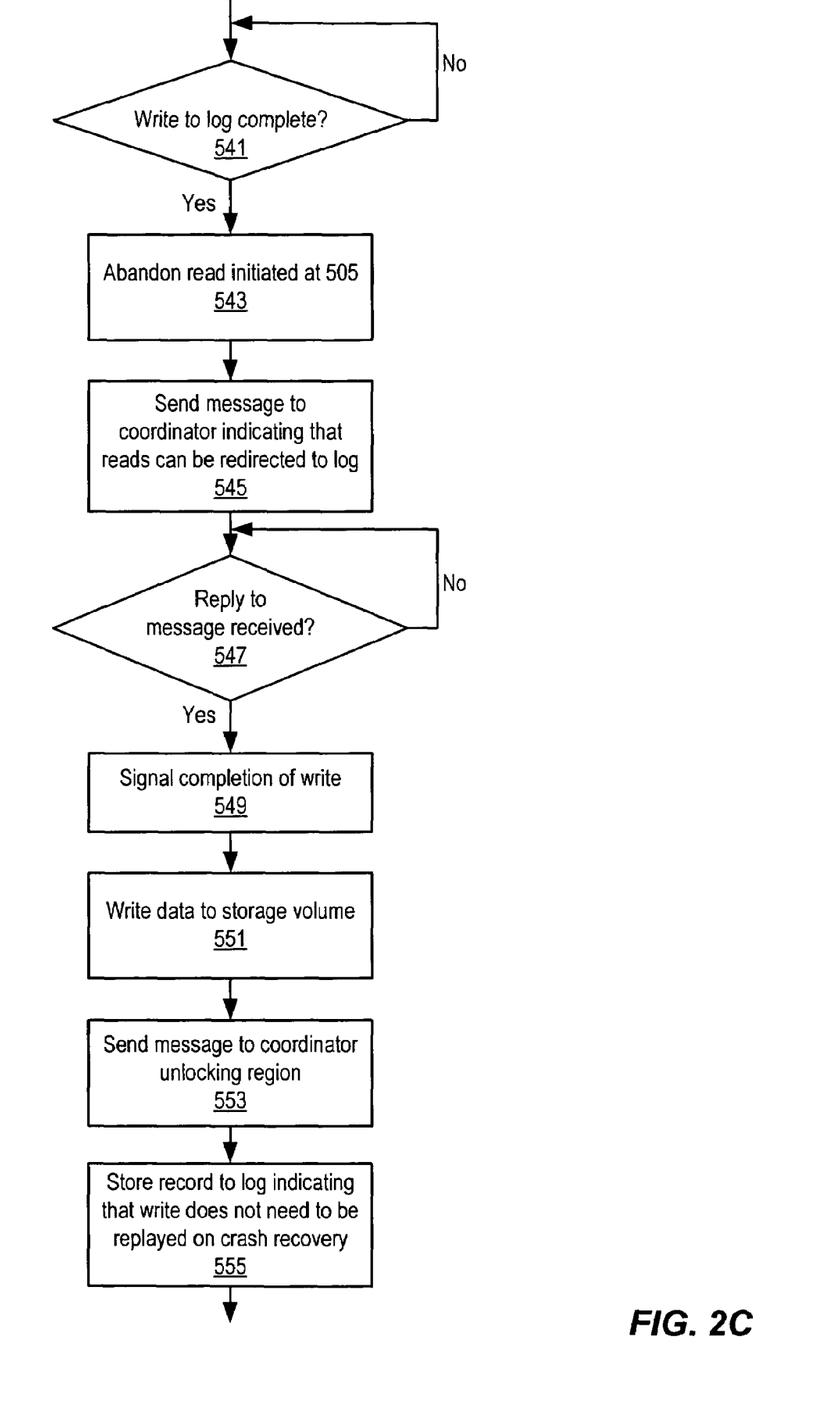
Figure 2D:
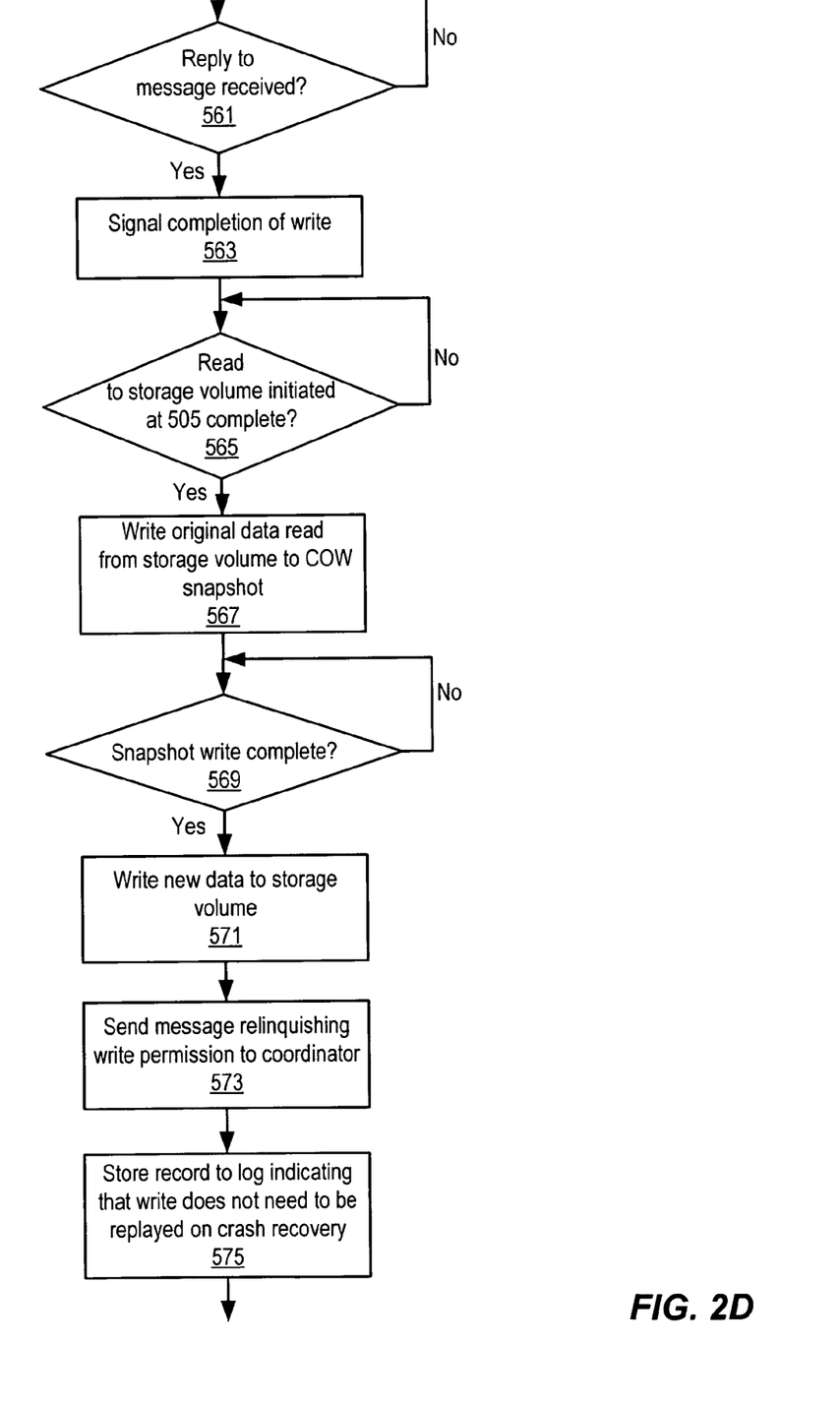

Referring back to block 511, if write permission is granted and the targeted region has already been relocated, the host may operate as shown in FIG. 2C. If the write to the log has completed, as determined at 541, the host may send the coordinator a message indicating that any reads targeting that region of the storage volume may be redirected to the host's log, as indicated at 545. The host may also abandon the read initiated at 505, since there is no need to relocate the data currently stored in that region of the storage volume to a snapshot volume.

When the host receives a response from the coordinator acknowledging the message sent at 545, the host may signal completion of the write to the initiating application, as shown at 547-549. The host may then perform the asynchronous block operations needed to perform the write to the storage volume, as indicated at 551. Upon completion of these asynchronous block operations, the host may send a message to the coordinator relinquishing write permission for the targeted region, as shown at 553. The host may also asynchronously write information to its log indicating that the logged write completed at 541 does not need to be replayed during crash recovery. This write to the log may be performed before or after write permission to the targeted region of the storage volume is relinquished.

In some embodiments, the coordinator may use exclusive locks on the blocks within the storage volume to coordinate between writes initiated on different hosts. For example, if a request for permission to write a block that is currently not locked is received by the coordinator, the coordinator may respond to the request by granting the requesting host the exclusive lock on that block. Upon completing the asynchronous block operations related to that write, the host may release the lock by communicating with the coordinator. While the host holds the exclusive lock, the coordinator may not grant any other host the exclusive lock on that block.

Referring back to FIG. 1, it is noted that the virtualization layer 210 may perform the asynchronous block operations to complete the write to the storage volume 250 by either reading the write data from memory 206 or by reading the write data from the log 240. In some situations, the write data may not be preserved in the memory 206 after the virtualization layer 210 signals completion of the write to the initiating application. In these situations, the virtualization layer may perform the asynchronous block operations by reading the write data from the log 240. These situations may arise, for example, when an application that initiated the write receives the signal that the write is complete and responsively reuses or releases the memory 206 allocated to store the write data. In some embodiments, the virtualization layer 210 may copy the write data to another location in memory 206 prior to signaling completion of the write so that a read to the log 240 is not needed when performing the asynchronous block operations to complete the write to the storage volume. The virtualization layer 210 may condition this copy operation on various criteria, such as load on the host and/or memory 206 and/or the amount of delay caused by performance of the copy. Depending on which criteria are met when a given write request is being handled, the virtualization layer 210 may selectively choose whether to copy the write data in memory 206 or to allow the write data to be discarded from the memory 206, causing the virtualization layer 210 to instead read the write data from the log 240.

By allowing the write data to be written to the log 240 before the coordinator 260 has responded to the write request, the write latency (as seen by the initiating application) may be the larger of the message round-trip time from the host 102 to the coordinator 260 and back or the time to perform the write to the log 240. Furthermore, semantics may be preserved, despite allowing the write data to be written to the log 240 prior to receiving a response from the coordinator 260, by configuring the coordinator to only allow one host to have permission to write to a given block of the storage volume 250 at any particular time and having a host performing a write not relinquish its write permission until completion of the asynchronous block operations needed to update the storage volume 250 in accordance with the write. Because the coordinator 260 only gives one host permission to write to a given block at a given time, subsequent writes to the same block may not be signaled as being completed until completion of the asynchronous block operations related to prior writes to that block.

Since the underlying block operations needed to update the storage volume 250 are performed asynchronously, the time taken to perform the underlying block operations for the write may be less critical to application performance. In some embodiments, the distributed virtualization layer 210 may take advantage of this by combining the asynchronous block operations for multiple logged writes. This may provide opportunities for more efficient access to the storage volume(s) 250 and/or allow some block operation overhead to be amortized over several writes. For example, if several previously un-relocated regions of the storage volume are being written by several writes initiated on a particular host, the virtualization layer on that host may combine the operations used to allocate space for the original contents of those regions in the snapshot volume 255 and/or to write the original contents of those regions to the snapshot volume 255. Thus, instead of performing an allocation operation for each write operation, the host may perform one allocation operation for several write operations.

In some embodiments, each instance of the virtualization layer 210 may be configured to combine several writes to a log 240. For example, in response to an application initiating a write, the virtualization layer 210 may wait for a short delay period to see if any additional writes are initiated. If so, the virtualization layer 210 may then combine the write activity to the log 240 for multiple writes initiated during that delay period.

Figure 3:
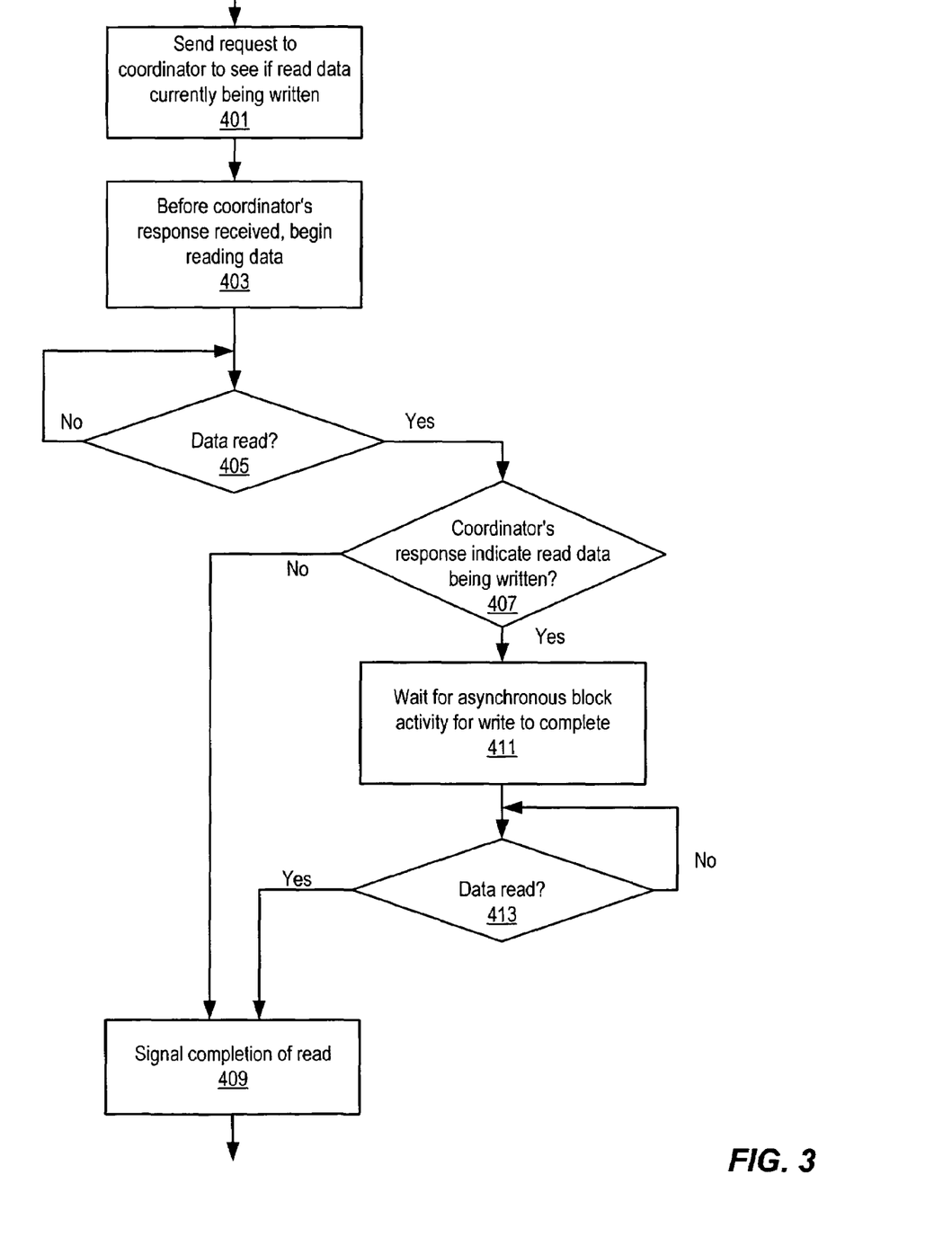
FIG. 3 is a flowchart illustrating how distributed logged writes may be coordinated with reads, according to one embodiment.

FIG. 3 is a flowchart of one embodiment of a method of coordinating read and write accesses initiated on different hosts. At 401, a host on which an application initiates a read may send a read request to a coordinator to determine if the read address is currently being written. Before the coordinator's response is received, the host may begin reading the read data from the last known location of the read data, as indicated at 403. The coordinator may respond to the read request sent at 403 based on whether the address being read is currently locked by a writer.

Once the data is read (as determined at 405) and the coordinator's response is received, the read is signaled as complete if the coordinator's response indicates that the read data is not currently being written, as shown at 407 and 409. However, if the coordinator's response indicates that the read data is currently being written, and thus that the data read at 403 may be incorrect, the host may wait for the asynchronous block activity for the write to complete, as indicated at 407 and 411, and then re-read the data at 403 in order to obtain the current value. Completion of the asynchronous block activity for the write may be indicated by the coordinator sending the host a message indicating that the read can resume. It is noted that when the host re-reads the data, the host may not send another read request to the coordinator since the host already knows that the data is not being written at 411. Accordingly, as soon as the restarted read completes, as determined at 413, the host may signal completion of the read at 409. It is also noted that functions 401-413 may be performed by a virtualization layer executing on the host.

In an alternative embodiment, if the coordinator's response indicates that the block being read is currently locked by a writer, the host performing the read may not wait for the earlier-initiated read to complete (as determined at 405) before performing another read in response to completion of the write at 411. The data returned for the earlier-initiated read may be discarded.

In other alternative embodiments, the coordinator may redirect a read to a log instead of delaying the read when the block being read is currently locked by a writer. For example, if one host initiates a read for a block being written by another host and if the other host's write has already completed to that host's log (e.g., as indicated by that host sending the coordinator a message as shown at 515 of FIG. 2B), the coordinator's response to the reading host may indicate the location of the modified block in the writing host's log. If reads are redirected to logs, the coordinator may track outstanding reads in order to determine when the data in the logs may be overwritten. For example, each time a host initiates a read from a log, the coordinator may increment a hold count associated with the region being read. As hosts complete reads to that region, the coordinator may decrement the hold count. The coordinator may only allow the region of the log to be modified when the associated hold count indicates that no outstanding reads are accessing that region of the log. Accordingly, each host may be unable to reallocate a region within its log if any reads that have been redirected to that region of the log are still outstanding, as indicated by the number of outstanding reads maintained by the coordinator. In some embodiments, reads may be redirected to a writing host's cache (as opposed to being redirected to the writing host's log).

In some embodiments, the coordinator may act to selectively delay reads or redirect reads. For example, the coordinator may initially operate to delay reads that target blocks of the storage volume currently being written. The coordinator may also track the percentage of reads that are delayed in this manner. If the percentage of reads that are delayed reaches a threshold value, the coordinator may begin redirecting reads that conflict with ongoing writes to the appropriate logs. In some embodiments, the coordinator may maintain information for each log indicating a general location of any current write activity to that log and a general structure of that log's layout. Using this information, the coordinator may selectively allow reads to be redirected to the log if the execution of the read on the physical storage will not interfere with writes to the log (e.g., such interference would happen if the read targets a section of a log that is located on a disk that is currently not being accessed).

In some embodiments, hosts may not initiate reads prior to receiving a response from the coordinator. Instead, hosts may wait until a response indicating that the read can progress and indicating the correct location of the data (either in the storage volume or a log) before beginning to read the data.

In embodiments in which hosts may speculatively begin reading data from the storage volume prior to receiving a response from the coordinator indicating whether read access is proper, situations may arise in which the coordinator does not handle an overlapping read until completion of the write with which that read overlaps. However, the host performing the read may have speculatively read the old version of the data being written. In order to avoid erroneously returning an indication that the speculatively read data is correct (since no write is currently taking place to the targeted region of the storage volume at the time the coordinator handles the read), the coordinator may use event counters and write history.

Referring back at FIG. 1, event counters may be implemented by the virtualization layer 210 on each host 102 and by the coordinator 260. Each host 102 may initially set its event counter value to zero. Whenever a host 102 sends a request for permission to access a region of the storage volume 250 to the coordinator 260, the host 102 may include the current value of its event counter in the request message. The coordinator 260 may include the current value of its event counter in each response message sent to a host 102. In response to a message from the coordinator 260, a host 102 may update its event counter to the value provided by the coordinator 260 in the message. The coordinator 260 may update its event counter each time a new write request is received.

The coordinator 260 may also track write history by maintaining a record of recently handled write requests (e.g., the last 200 write requests) and the event counter values associated with those write requests. Each time a read request is received, the coordinator 260 may compare the event counter value included in the read request message with the event counter values recorded in the write history. If any of the event counter values in the write history indicate that one of the writes may overlap with the read, the coordinator 260 may send a response to the host 102 performing the read indicating that the speculatively read data should be discarded and a non-speculative read should be initiated (either to a log 240 or to the storage volume 250 subsequent to completion of the overlapping write to the storage volume). If the event counter value included in the read request message is not within the range of event counters currently maintained in the coordinator's write history, the coordinator may also send a response indicating that the read should be retried.

In an embodiment such as that shown in FIG. 3, each host may maintain physical location information for each block of data in the storage volume. In some embodiments, asynchronous block operations performed for a write access may change the physical location of certain blocks. Accordingly, if asynchronous block operations modify the location of any block, the host performing the asynchronous block operations may notify each other host of the new location of that block.

It is noted that in some embodiments, virtualization layer 210 and/or coordinator 260 may each combine multiple requests and/or responses into a single message on the communication network 106. For example, an instance of the virtualization layer 210 may be configured to wait for a short time between sending requests to the coordinator 260 or to wait for a short time after receiving a request from an application before sending a corresponding request to the coordinator 260. During such wait periods, the virtualization layer 210 instance may collect all read and/or write requests initiated on that host 102 into a single message (or at least fewer messages than the total number of read and/or write requests received during that period) for sending to the coordinator 260. The coordinator 260 may be configured to similarly collect multiple responses (to read and/or write requests) being sent to the virtualization layer 210 on a particular host into a single response message.

In some embodiments, the virtualization layer 210 and coordinator 260 may operate to implement read leases. An instance of the virtualization layer 210 executing on a host 102 may acquire a read lease from the coordinator 260 in the same manner as permission is acquired to perform a write. Read leases may each correspond to a region of storage in storage volume 250. A host 102 may acquire a read lease on a region in order to perform several reads to that region. If the coordinator 260 receives a request for permission to write a block within that region while the read lease is held, the coordinator 260 may send the host holding the read lease a message on the network 106 revoking the read lease prior to sending a response to the host requesting write permission. Accordingly, the write cannot be signaled as complete to the application that initiated the write until the read lease has been revoked. It is noted that several different hosts 102 may hold a read lease on the same region or on overlapping regions at the same time.

In another embodiment, a read lease may not block write permission to a block for which a read lease is currently held. In other words, the coordinator 260 may not require that the read lease on a block be revoked before write permission for that block is granted. However, the coordinator 260 may provide information identifying which hosts 102 currently hold a read lease on that block to the host performing the write, allowing the writing host to appropriately revoke the read leases and/or communicate with the hosts holding the read lease as necessary. For example, if performance of the asynchronous block operations related to the write modify the physical location of a block, the writing host may send each host identified by the coordinator 260 as holding the read lease on that block a message indicating the new physical location of the block.

Messages sent between the coordinator 160 and the hosts 102 may be used to propagate state information about the physical location of those blocks. For example, whenever coordinator 260 sends a response to a read request indicating that the read data is not currently locked from writing, the coordinator 260 may include information in that message indicating the current physical location of the read data. If the physical location of the read data indicated in the coordinator's response differs from mapping information used by that host to perform the read, the host may re-read the data from the correct location provided by the coordinator. Similarly, whenever the coordinator 260 revokes a read lease to a region of the storage volume 250, any host whose read lease is revoked may automatically invalidate local mappings indicating the physical location(s) of the block(s) within that region. In some embodiments, propagating state information in messages sent to and/or from the coordinator 260 may reduce the amount of message traffic on network 106. Messages to and/or from the coordinator 260 may also be used to transmit other state information, such as write sequence numbers indicating the ordering of writes, among the hosts 102.

In many embodiments, at least some reads and writes may target multiple blocks. Accordingly, locks such as write permissions and other access structures (e.g., read leases) managed by the coordinator 260 may also correspond to multiple blocks. For example, a host 102A may request write permission for a group of several blocks in a single request, and coordinator 260 may grant host 102A write permission to a region within the storage volume 250 that includes those blocks. While host 102A has write permission to that region, the coordinator may not allow any other host to gain write permission to blocks within that region.

It is noted that some embodiments may include multiple coordinators 260. For example, each coordinator 260 may be assigned a unique range of block addresses and be configured to coordinate the hosts' access to the block addresses assigned to that coordinator. In one such embodiment, if each coordinator 260 is configured to handle address ranges corresponding to regions of the storage volume 250 and there are three coordinators 260, addresses corresponding to regions 1, 4, 7, and so on may be assigned to the first coordinator, addresses corresponding to regions 2, 5, 8, and so on may be assigned to the second coordinator, and addresses corresponding to regions 3, 6, 9, and so on may be assigned to the third coordinator. In other embodiments, write requests may be assigned to coordinators 260 in other ways. For example, load-balanced assignment techniques may be used to route write requests to coordinators. Alternatively, write requests may be assigned to particular coordinators dependent on a hash of the first few bits of the address of the block(s) being written. Other techniques may also be used to assign write requests to coordinators. Providing more than one coordinator may decrease the load on each coordinator in some embodiments.

In some embodiments, the logs 240 may each be block-structured devices. If multiple write accesses to a log 240 are needed to log the write data for a particular write (i.e., if logging a single write requires several underlying accesses to log 240), during crash recovery it may be difficult for the virtualization layer 210 to determine whether the underlying accesses needed to log the write to the log completed prior to a system crash. The virtualization layer 210 may write additional data to the log in order to indicate whether the underlying accesses needed to log the write finished prior to a system crash. For example, the virtualization layer 210 may write a trailer for the write data to the log in a separate step performed after all blocks of write data have been written to the log. If a system crash occurs, the virtualization layer 210 may read the trailer to determine if all of the write data was written to the log prior to the system crash. Since the write would not have been signaled as being completed to the initiating application if the write to the log did not complete, the virtualization layer 210 may choose to not recover a write having an incomplete log entry.

In another embodiment, the virtualization layer 210 may attach a header to each sector of write data written to the log (assuming each sector is written to the log in a single operation). The header may include a sequence number corresponding to each sector of the write. The virtualization layer 210 may, in some embodiments, replace a small portion of the write data in each sector with this header information. The replaced portion of the write data from each sector may be written into another sector (e.g., a header block associated with the write data). This additional sector may be written concurrently with the other sectors of write data and header information. This additional sector may also include header information, such as a sequence number, and/or other metadata about the logged write. The sequence numbers may also be used to determine whether all of the write data was written to the log prior to the system crash.

The logs 240 may be implemented in distinct storage volumes in some embodiments. For example, each host 102 may be coupled to an independent storage volume. Alternatively, the hosts 102 may share a large volume that is divided into regions. As used herein, a region is a group of one or more blocks (e.g., a region may be a 128 Mb or 512 Mb range of the storage volume). In anticipation of demand, the coordinator 260 may assign one or more regions to a host 102 for use as that host's independent log. The virtualization layer 210 may track the amount of log 240 currently in use at each host. For example, each host 102 may monitor its log 240 and send a request for more log 240 region(s) to the coordinator 260 whenever the current usage indicates that more log 240 space may be needed. Similarly, a host 102 may notify coordinator 260 whenever a region within the log 240 is no longer needed, allowing the coordinator 260 to reassign that region to another host 102.

In some embodiments, logs 240 may provide redundant or fault-tolerant storage by providing mirroring and/or parity for the logged data. In some embodiments, logs 240 may be configured to be at least as redundant and/or fault tolerant as the underlying storage volume(s) 250. Providing redundant and/or fault tolerant logs 240 may reduce the possibility that data loss or corruption will occur between the time the write is completed to the log and the time at which the underlying block activity needed to complete the write to the underlying storage volume completes. It is also noted that in some embodiments, each log 240 may be used to log writes to multiple different storage volumes 250.

Logs 240 may implement striping or mirroring to improve log bandwidth in some embodiments. For example, if it is likely that two or more streams will write to different parts of a log 240 during overlapping periods, it may be desirable to implement striping or other techniques to enhance the bandwidth of the log. Alternatively (or additionally), logs 240 may each include non-volatile write-back cache to improve log latency.

In some embodiments, logs 240 may each be implemented as append-only logs. For example, the logs 240 may be implemented as circular queues. In alternative embodiments, logs 240 may be implemented as write-anywhere logs.

Various embodiments may further include receiving, sending or storing instructions and/or data that implement the distributed virtualization layer and/or coordinator functionality in accordance with the foregoing description upon a computer accessible medium. Generally speaking, a computer accessible medium may include storage media or memory media such as magnetic or optical media, e.g., disk or CD-ROM, volatile or non-volatile media such as RAM, ROM, MEMS (Micro Electro-Mechanical Systems) memory, Flash memory, etc., as well as transmission media or signals such as electrical, electromagnetic, or digital signals, conveyed via a communication medium such as network and/or a wireless link.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method for coordinating access to a storage volume between a plurality of hosts, wherein each host is associated with one of a plurality of logs, the method comprising:

a host of the plurality of hosts receiving from an application a write request to write application data to a region of the storage volume;

the host requesting permission from a coordinator to write the application data to the region of the storage volume;

the host storing the application data to an associated one of the plurality of logs;

the host initiating a read of an old version of data in the region of the storage volume;

the host receiving from the coordinator a response granting permission to write the application data to the region of the storage volume, wherein the response indicates that the old version of data in the region of the storage volume should be relocated to a COW (Copy On Write) snapshot volume;

the host writing the old version of data in the region of the storage volume to the COW snapshot volume in response to the indication that the old version of data in the region of the storage volume should be relocated;

the host providing a signal to the application indicating completion of the write request, wherein the signal is provided to the application prior to writing the application data to the region of the storage volume and subsequent to both storing the application data to the associated one of the plurality of logs and receiving the response from the coordinator; and the host writing the application data to the region of the storage volume after providing the signal to the application and after writing the old version of data in the region of the storage volume to the COW snapshot volume.

2. The method of claim 1,
wherein the host initiates the read of the old version of data in the region of the storage volume prior to receiving from the coordinator the response granting permission to write the application data to the region of the storage volume.

3. The method of claim 2, wherein the host writes the old version of the data in the region of the storage volume to the COW snapshot volume after providing the signal to the application.

4. The method of claim 1,
wherein the host initiates the read of the old version of data in the region of the storage volume after receiving from the coordinator the response granting permission to write the application data to the region of the storage volume.

5. The method of claim 1, wherein said storing the application data to the associated one of the plurality of logs is initiated prior to receiving the response granting permission to write the application data to the region of the storage volume.

6. The method of claim 1, further comprising the host sending the coordinator a first message indicating that reads targeting the region of the storage volume can be redirected to the associated one of the plurality of logs after both storing the application data to the associated one of the plurality of logs and receiving the response from the coordinator.

7. The method of claim 6, further comprising the host receiving from the coordinator a second message acknowledging the first message sent by the host, wherein the host provides the signal indicating completion of the write subsequent to receiving the second message from the coordinator.

8. The method of claim 7, wherein the host is a first host of the plurality of hosts, wherein the method further comprises:

a second host of the plurality of hosts requesting permission from the coordinator to perform a read to the region of the storage volume before the first host has written the application data to the region of the storage volume; and the coordinator returning a response to the second host redirecting the read to the associated one of the plurality of logs associated with the first host.

9. The method of claim 8, further comprising the second host initiating the read to the region of the storage volume before receiving the response from the coordinator and discarding data obtained by initiating the read in response to receiving the response.

10. The method of claim 1, further comprising:
each of the plurality of hosts updating a respective event counter in response to receiving responses from the coordinator;
the coordinator updating a coordinator event counter each time a write request for permission to write a region of the storage volume is received from one of the plurality of hosts;
each of the plurality of hosts including a current value of the respective event counter in each read request for permission to read a region of the storage volume sent to the coordinator;
the coordinator tracking a plurality of write requests and event counter values received with each of the plurality of write requests;
in response to receiving a read request from one of the plurality of hosts, the coordinator comparing the current value of the respective event counter included in the read request to the event counter values received with each of the plurality of write requests tracked by the coordinator.

11. The method of claim 1, wherein the host is a first host of the plurality of hosts, wherein the application is a first application, wherein the write request is a first write request, wherein the application data is first application data, wherein the method further comprises:
a second host of the plurality of hosts receiving from a second application a second write request to write second application data to the region of the storage volume;
the second host requesting permission from the coordinator to write the second application data to the region of the storage volume prior to the first host writing the first application data to the region of the storage volume;
the coordinator sending a response to the second host indicating that the region of the storage volume is currently being written;
in response to receiving the response, the second host waiting until the first host writes the first application data to the region of the storage volume before writing the second application data to the region of the storage volume; and
the second host providing a signal to the second application indicating completion of the second write request subsequent to writing the second application data to the region of the storage volume.

12. The method of claim 11, further comprising the second host storing the second application data to one of the plurality of logs associated with the second host, wherein the second host provides the signal to the second application indicating completion of the second write request subsequent to both writing the second application data to the storage volume and storing the second application data to the log associated with the second host.

13. The method of claim 1, wherein the write request is a first write request, wherein the application data is first application data, wherein the region of the storage volume is a second region, wherein the method further comprises:
the host identifying a second region of the storage volume that has previously been relocated to the COW snapshot volume as a relocated region;
the host writing second application data to the second region of the storage volume without requesting permission from the coordinator to write the second application data and without storing the second application data to the associated one of the plurality of logs.

14. A system, comprising:
one or more microprocessors;
a memory coupled to the one or more microprocessors, the memory storing program instructions executable by the one or more microprocessors to:
receive from an application a write request to write application data to a region of the storage volume;
request permission from a coordinator to write the application data to the region of the storage volume;
store the application data to an associated one of a plurality of logs;
initiate a read of an old version of data in the region of the storage volume;
receive a response from the coordinator granting permission to write the application data to the region of the storage volume, wherein the response indicates that the old version of data in the region of the storage volume should be relocated to a COW (Copy On Write) snapshot volume;
write the old version of data in the region of the storage volume to the COW snapshot volume in response to the indication that the old version of data in the region of the storage volume should be relocated;
provide a signal to the application indicating completion of the write request, wherein the signal is provided to the application prior to writing the application data to the region of the storage volume and subsequent to both storing the application data to the associated one of the plurality of logs and receiving the response from the coordinator; and
write the application data to the region of the storage volume after providing the signal to the application and after writing the old version of data in the region of the storage volume to the COW snapshot volume.

15. The system of claim 14,
wherein the read of the old version of data from the region of the storage volume is initiated prior to receiving from the coordinator the response granting permission to write the application data to the region of the storage volume.

16. The system of claim 14, wherein said storing the application data to the associated one of the plurality of logs is initiated prior to receiving the response from the coordinator.

17. The system of claim 14, wherein the program instructions are further executable to send the coordinator a message indicating that reads targeting the region of the storage volume can be redirected to the associated one of the plurality of logs after both storing the application data to the associated one of the plurality of logs and receiving the response from the coordinator.

18. A computer accessible memory medium storing program instructions executable to:
receive from an application a write request to write application data to a region of the storage volume;

request permission from a coordinator to write the application data to the region of the storage volume;
store the application data to an associated one of a plurality of logs;
initiate a read of an old version of data in the region of the storage volume;
receive a response from the coordinator granting permission to write the application data to the region of the storage volume, wherein the response indicates that the old version of data in the region of the storage volume should be relocated to a COW (Copy On Write) snapshot volume;
write the old version of data in the region of the storage volume to the COW snapshot volume in response to the indication that the old version of data in the region of the storage volume should be relocated;
provide a signal to the application indicating completion of the write request, wherein the signal is provided to the application prior to writing the application data to the region of the storage volume and subsequent to both storing the application data to the associated one of the plurality of logs and receiving the response from the coordinator; and
write the application data to the region of the storage volume after providing the signal to the application and after writing the old version of data in the region of the storage volume to the COW snapshot volume.

19. The computer accessible memory medium of claim 18,
wherein the read of the old version of data from the region of the storage volume is initiated prior to receiving from the coordinator the response granting permission to write the application data to the region of the storage volume.

20. The computer accessible memory medium of claim 18, wherein said storing the application data to the associated one of the plurality of logs is initiated prior to receiving the response from the coordinator.

21. The computer accessible memory medium of claim 18, wherein the program instructions are further executable to send the coordinator a message indicating that reads targeting the region of the storage volume can be redirected to the associated one of the plurality of logs after both storing the application data to the associated one of the plurality of logs and receiving the response from the coordinator.

22. A computer system, comprising:
a storage volume and a COW (Copy On Write) snapshot volume;
a plurality of hosts coupled to the storage volume and the COW snapshot volume;
a plurality of logs, wherein each of the plurality of log is associated with a respective one of the plurality of hosts; and
a coordinator coupled to the plurality of hosts and configured to coordinate access to the storage volume between the plurality of hosts;
wherein a first host of the plurality of hosts is configured to perform the following:
receive from a first application a write request to write application data to a region of the storage volume;
request permission from the coordinator to write the application data to the region of the storage volume;
store the application data to an associated one of the plurality of logs;
initiate a read of an old version of data in the region of the storage volume;
receive from the coordinator a response granting permission to write the application data to the region of the storage volume, wherein the response indicates that the old version of data in the region of the storage volume should be relocated to the COW (Copy On Write) snapshot volume;
write the old version of data in the region of the storage volume to the COW snapshot volume in response to the indication that the old version of data in the region of the storage volume should be relocated;
provide a signal to the first application indicating completion of the write request, wherein the signal is provided to the first application prior to writing the application data to the region of the storage volume and subsequent to both storing the application data to the associated one of the plurality of logs and receiving the response from the coordinator; and
write the application data to the region of the storage volume after providing the signal to the application and after writing the old version of data in the region of the storage volume to the COW snapshot volume.

23. The system of claim 22, wherein the first host is configured to initiate the read of the old version of data from the region of the storage volume prior to receiving the response from the coordinator.

24. The system of claim 22, wherein said storing the application data to the associated one of the plurality of logs is initiated prior to receipt of the response granting permission to write the application data to the region of the storage volume.

25. The system of claim 22, wherein the first host is configured to send the coordinator a message indicating that reads targeting the region of the storage volume can be redirected to the associated one of the plurality of logs after both storing the application data to the associated one of the plurality of logs and receiving the response from the coordinator.

26. The system of claim 25, wherein the first host is configured to provide the signal to the first application indicating completion of the write request after receiving another message from the coordinator acknowledging the message sent by the first host.

27. The system of claim 26, wherein a second host of the plurality of hosts is configured to request permission from the coordinator to perform a read to the region of the storage volume before the first host has written the application data to the region of the storage volume;
wherein the coordinator is configured to return a response to the second host redirecting the read to the associated one of the plurality of logs associated with the first host;
wherein the second host is configured to initiate the read to the region of the storage volume before receiving the response from the coordinator and to discard data obtained by initiating the read in response to receiving the response.

28. The system of claim 27, wherein each of the plurality of hosts is configured to update a respective event counter in response to receiving responses from the coordinator;
wherein the coordinator is configured to update a coordinator event counter each time a write request for permission to write a region of the storage volume is received from one of the plurality of hosts;
wherein each of the plurality of hosts is configured to include a current value of the respective event counter in each read request for permission to read a region of the storage volume sent to the coordinator;

wherein the coordinator is configured to track a plurality of write requests and event counter values received with each of the plurality of write requests;

wherein in response to receiving a read request from one of the plurality of hosts, the coordinator is configured to compare the current value of the respective event counter included in the read request to the event counter values received with each of the plurality of write requests tracked by the coordinator.

29. The system of claim 22, wherein the write request is a first write request, wherein the application data is first application data, wherein a second host of the plurality of hosts is configured to request permission from the coordinator to write second application data to the region of the storage volume before the first host writes the first application data to the region of the storage volume;

wherein the coordinator is configured to send a response to the second host indicating that the region of the storage volume is currently being written;

wherein in response to receiving the response, the second host is configured to wait until the first host writes the first application data to the region of the storage volume before writing the second application data to the region of the storage volume.

* * * * *